United States Patent [19]

Nishimura et al.

[11] 4,025,702
[45] May 24, 1977

[54] BATTERY CONSTRUCTION

[75] Inventors: Hajime Nishimura, Tokyo; Yasushi Nomura, Tokorozawa, both of Japan

[73] Assignee: Citizen Watch Co., Ltd., Tokyo, Japan

[22] Filed: Mar. 5, 1976

[21] Appl. No.: 664,326

[30] Foreign Application Priority Data

Mar. 10, 1975 Japan ............................ 50-28759
June 9, 1975 Japan ............................ 50-77801
Oct. 29, 1975 Japan ............................ 50-147649

[52] U.S. Cl. .......................... 429/142; 429/164; 429/174
[51] Int. Cl.² ........................................ H01M 2/02
[58] Field of Search .......... 136/107, 111, 166, 173; 429/142, 164, 167

[56] References Cited

UNITED STATES PATENTS

| | | | |
|---|---|---|---|
| 1,310,763 | 7/1919 | Maranda | 136/111 |
| 1,774,331 | 8/1930 | Koller | 136/173 |
| 2,978,862 | 4/1961 | Epperlein | 136/173 |
| 3,945,850 | 3/1976 | Lewis | 136/166 |
| 3,966,498 | 6/1976 | Wuthrich | 136/166 |

*Primary Examiner*—Donald L. Walton
*Attorney, Agent, or Firm*—Frank J. Jordan

[57] ABSTRACT

A battery having a battery cup and a battery cap which has a ridge portion to provide a battery chamber for accommodating a positive electrode, a negative electrode and an electrolyte. The battery chamber has a contour at its outer periphery different from that of the sealing flanges of the battery cup and the battery cap.

11 Claims, 11 Drawing Figures

BATTERY CONSTRUCTION

This invention relates generally to miniaturized primary or secondary batteries for use in electronic timepieces and other small size portable electronic devices, and more particularly to an improvement over the construction of such batteries.

In recent years, small size batteries of larger capacity than previously were available have been increasingly developed, with the development of electronic timepieces and other small size portable electronic devices. Of these, alkali type cells such as mercury or silver oxide batteries using potassium hydroxide (KOH) or sodium hydroxide (NaOH) as an electrolyte are well known in the art. Most recently, other types of cells, such as a lithium battery using an organic electrolyte, have also become known in the art. These batteries usually have a chamber to accommodate a positive electrode material, a negative electrode material and an electrolyte absorbent layer, etc. This chamber will be referred to as the battery chamber hereinafter. The battery chamber is generally formed in a cylindrical shape, the cell having a top cap and a bottom cup, with annular flanges or shoulders at their outer peripheries so that the battery chamber can be easily sealed by crimping operations at the time of battery assembly, to prevent leakage of the electrolyte from the battery chamber. This sealing ensures long battery life. This cylindrical configuration of the battery is not necessarily the most suitable shape, especially for electronic timepieces and other portable electronic devices, because its basic configuration causes wasted space. Another drawback is that the cylindrical configuration of the battery creates difficulties in accommodating electronic components and mechanical parts in the most compact arrangement within the electronic timepiece or other portable electronic device, especially when the device has to be manufactured small in size and of reduced thickness.

It is, therefore, an object of the present invention to provide a new and improved battery for use in electronic timepieces and other portable electronic devices.

It is another object of the present invention to provide a new and improved battery which is simple in construction and easy to manufacture.

It is another object of the present invention to provide an improved construction for a battery by which the battery has a minimum thickness yet provides a large discharge capacity.

It is a further object of the present invention to provide a battery having a two part container comprised of a battery cap and a bottom cup with the bottom cup normally being used as a part of an electronc device, such as the back cover of an electronic timepiece.

These and other objects, features and advantages of the present invention will become more apparent from the following description when taken in conjunction with the accompanying drawings, in which.

In the design of an electronic wristwatch, it has been usual practice to consider a battery having a cylindrical shape as being indispensable, and to design the arrangement or positioning of other electronic components and mechanical parts to accommodate the shape of such a battery.

Figure 1:
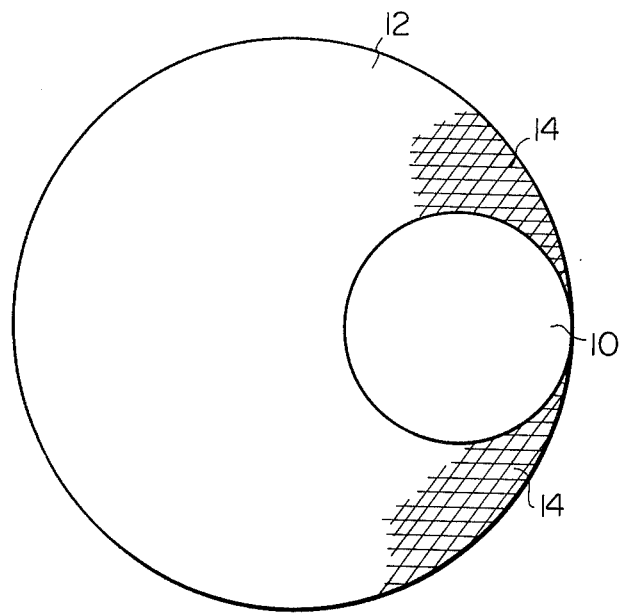
FIG. 1 is a view illustrating an example of an electronic timepiece incorporating a conventional battery.

As shown in FIG. 1, it is common practice to place a battery 10 in a watch case 12 near the side wall thereof. Under this circumstance, spaces 14 of the watch case 12 are wasted, as shown by the hatched areas. These areas cannot be effectively utilized for accommodating electronic components or mechanical parts of the wristwatch, resulting in increased thickness of the wristwatch.

To solve this problem, it has heretofore been proposed to provide a cylindrical battery having a container which includes a part common to the back cover of the wristwatch. Such a battery has a thickness greater than 2.5 mm, from manufacturing considerations and, therefore, makes it difficult to manufacture a wristwatch of reduced thickness.

Figure 2:
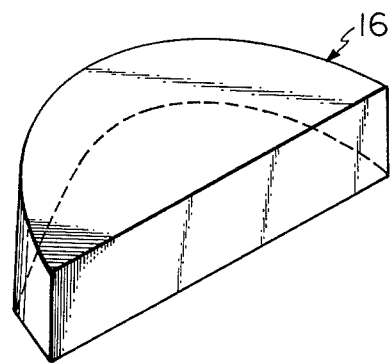
FIG. 2 is a perspective view of another conventional battery having a semi-circular periphery.

In order to overcome the above shortcomings, it has also been proposed to provide a battery 16 having a semicircular periphery as shown in FIG. 2. This battery has a drawback in that difficulty is encoutered in achieving complete sealing of the battery container by crimping operations during assembly. Thus, leakage of the electrolyte from the battery container can frequently take place. Such a battery is therefore not suitable for use in electronic devices in which long battery life is required.

The present invention contemplates the provision of an improved battery having reduced thickness yet ensuring long life. According to the present invention, the battery has a battery chamber with an outer periphery differing from the outer peripheries of the joining flanges of the battery cap and the bottom cup. More specifically, the joining flanges of the battery cap and the bottom cup are formed in a substantially annular shape to provide ease of sealing during crimping operation of the battery assembly, whereas the battery chamber has a contour at its periphery other than circular, to provide increased space for the electronic components and mechanical parts of the electronic device. With this arrangement, the battery has a high discharge capacity and long life.

Figure 3A:
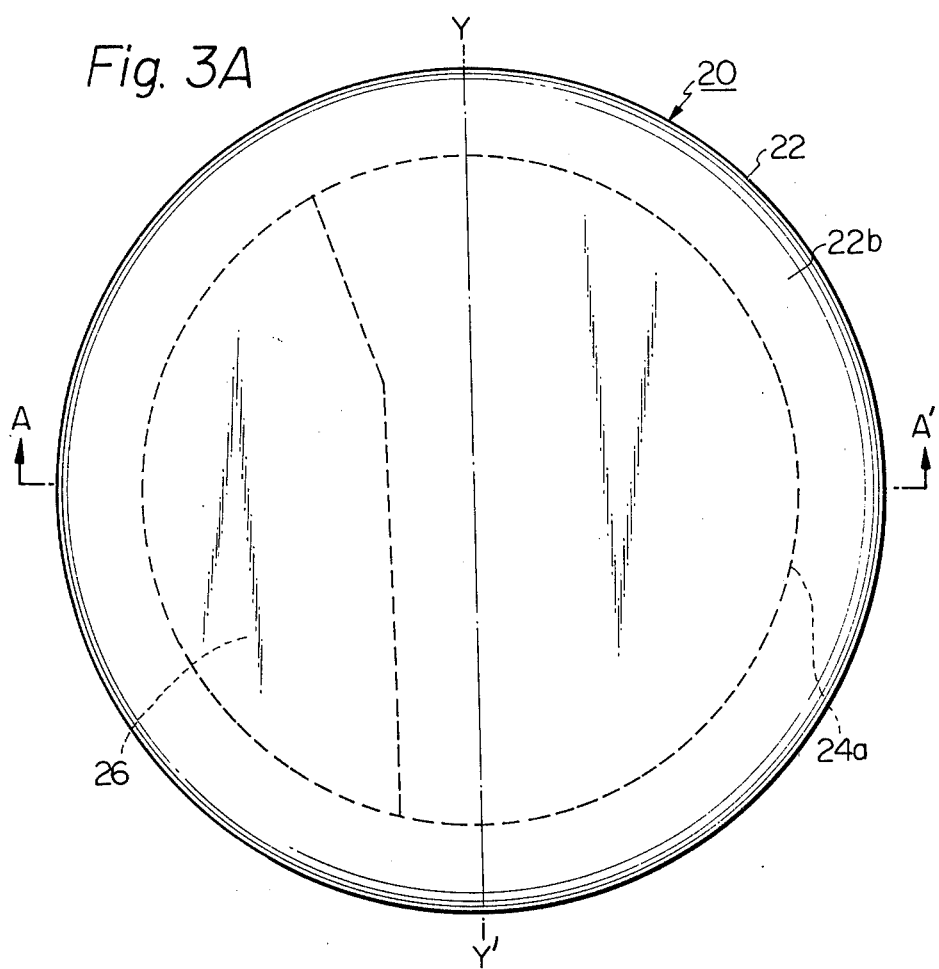
FIG. 3A is a plan view of a preferred embodiment of a battery according to the present invention.
Figure 3B:
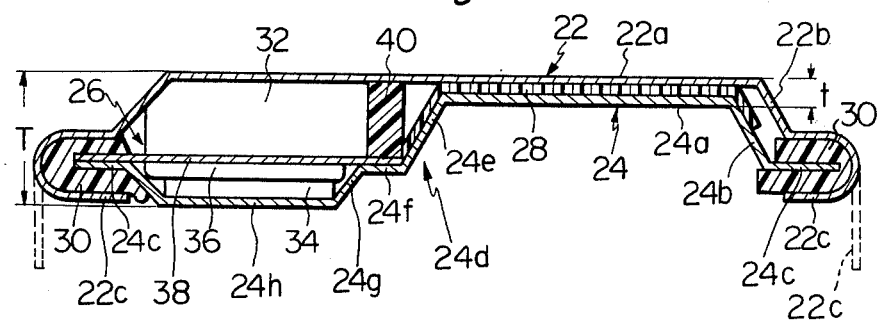
FIG. 3B is a cross-sectional view taken along line A—A' of FIG. 3A.

FIGS. 3A and 3B illustrate a preferred embodiment of a battery according to the present invention, achieving the concept mentioned above. In this illustrated embodiment, the battery 20 generally comprises a battery cup 22, and a battery cap 24. As best shown in FIG. 3B, the battery cup 22 is used as a back cover of an electronic wristwatch and has a circular flat wall 22a, a slanted wall 22b and an annular flange 22c which will be crimped inward during battery assembly. The battery cap 24 has a flat wall 24a of partially circular periphery and a slanted wall 24b contiguous with an annular flange 24c forming an outer periphery of the battery cap 24. The battery cap 24 also has a ridge portion 24d comprising a first slanted wall 24e, a shoulder 24f, a second slanted wall 24g and a flat wall 24h. A battery chamber 26 is thus formed by the battery cup 22 and the ridge portion 24d of the battery cap 24. The electrode construction of the battery is housed in the battery chamber 26. The cap 24 is insulated from the cup flat wall 22a and the flange 22b by means of an insulating layer 28 disposed between the flat portion of the cap 24 and the flat wall 22a of the cup 22, and a grommet 30 which is compressed between the flange 24c of the cap 24 and the flange 22b of the cup 22 by a crimping-operation during battery assembly, providing a compression seal between these parts. Since the grommet is compressed near the peripheries of the cap and cup, the battery is easily and reliably sealed. As shown in FIG. 3A, the outer peripheries of the battery chamber 26 and the flat wall 24a are assymmetric with respect to the axis Y—Y'.

The electrode construction is comprised of a positive electrode 32 disposed in the cup 22, and a negative electrode 34 housed by the cap 24. The negative electrode 34 is separated from the positive electrode 32 by means of an electrolyte absorbent layer 36 and a membrance barrier or separator 38. The separator 38 is disposed at its periphery between the grommet 30 and the flange 24c of the cap 24 and between the shoulder 24f of the ridge portion 24d and a separator support 40. The separator support 40 is placed between the flat wall 22a of the cup 22 and the separator 38 to hold the separator in place.

The battery cup 22 and the battery cap 24 are made of sheet metal (stainless steel, carbon steel, clad steel, etc.) by press working into the shapes shown in FIG. 3B, and the sealing is performed by crimping the flange 22 inward to compress the grommet between the flange 22c and the flange 24. In this manner, the sealing problem for the battery is overcome in the same way as in the prior art.

The battery cup mentioned hereinabove will normally be used as the back cover of an electronic wristwatch. In this application, the battery is manufactured such that the battery chamber 26 has a thickness T approximately equal to the thickness of the usual back cover of the wristwatch. If, in this case, te-electronic components and mechanical parts are designed to be accommodated within the space remaining in the watch case after the back cover has been attached thereto, the battery can be manufactured to have a significantly increased capacity. Thus, it is possible to manufacture a wristwatch of compact construction having a battery of longer life.

In another practical case, the battery chamber can be formed into various shapes or thicknesses, from design considerations of electronic components or mechanical parts of the electronic wristwatch. In this case, since the sealing surfaces of the battery are formed in a substantially annular shape, no problem is presented in crimping operations during battery assembly, and complete sealing can be reliably obtained even in cases where the battery chamber has contours other than circular. In all cases, the capacity of the battery will be proportional to the volume of the battery chamber.

In a thin electronic wristwatch which has been produced incorporating a battery of the present invention, the thickness T between the cup 22 and the cap 24 is less than 0.7 mm, and the battery chamber 26 has an area parallel to the watch face larger than that of a conventional battery of the cylindrical type. Thus the thickness T of the battery chamber 26 may have a smaller value. It is therefore possible to manufacture an electronic wristwatch of remarkably reduced thickness by employing a battery of the present invention.

In recently developed electronic watches incorporating a liquid crystal display, it has become possible to considerably miniaturize the watch case, in accordance with the improvements in electronic manufacturing techniques which enable production of miniaturized crystal vibrator elements and large scale integrated circuits for frequency divider and display driver circuits. In addition, the liquid crystal display elements can be contained in extremely thin glass cells to provide a display element having a thickness less than 1 mm. If the battery of the present invention is employed in combination with the above electronic components, it is possible to provide an electronic wristwatch of extremely thin shape.

Figure 4:
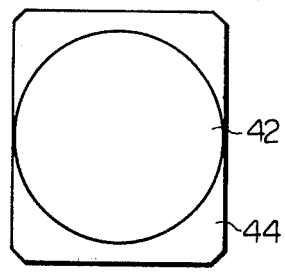
FIG. 4 is a plan view of a battery according to the present invention incorporated into the back cover of an electronic timepiece.
Figure 5:
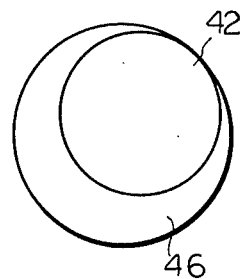
FIG. 5 is a view similar to FIG. 4 but shows another preferred embodiment of the battery according to the present invention.

As previously noted, the battery cup forming part of the battery of the present invention can be utilized as the back cover of a wristwatch. Where the wristwatch has a rectangular shape as shown in FIG. 4, a battery of the present invention may be such that a battery chamber 42 is combined with the back cover 44 of the rectangular wristwatch. It is also to be noted that the battery chamber 42 may be of cylindrical type, and, in this case, the battery chamber 42 can be combined with a round back cover 46 in a manner shown in FIG. 5.

Figure 6A:
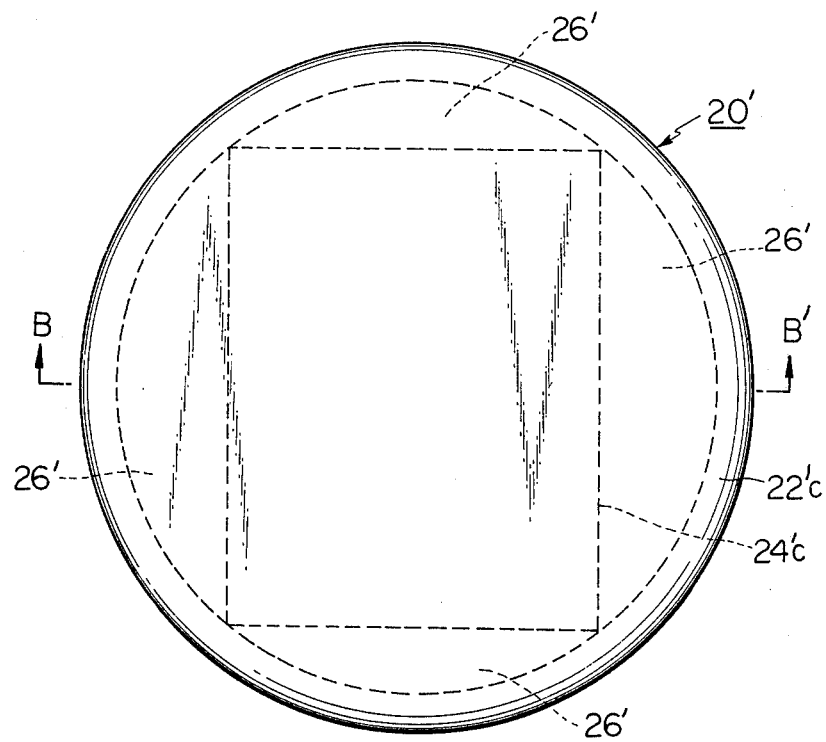
FIG. 6A is a plan view of another preferred embodiment of the battery according to the present invention.
Figure 6B:
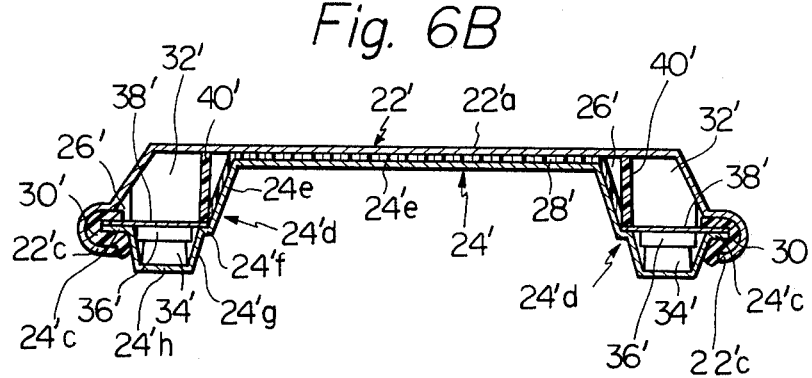
FIG. 6B is a cross-sectional view taken along line B—B' of FIG. 6A.

A modified form of the present invention is illustrated in FIGS. 6A and 6B in which like or corresponding component parts are designated by the same reference numerals as those used in FIGS. 3A and 3B except that a prime (') has been added thereto. In this modification, the battery cap 24' has a substantially rectangular flat wall 24'a to provide four arc-shaped battery chamber 26'. Each battery chamber includes the same electrode construction as that of FIGS. 3A and 3B and, therefore, detailed description of the same is herein omitted.

In this modification, the battery cup 22' is utilized as the back cover of a wristwatch. The battery cap 24' provides a substantially rectangular spacing which can accommodate an IC chip having a rectangular shape and other components such as display elements in a compact manner,to provide a remarkably thin wristwatch. It should be noted that each battery chamber may be modified into various shapes in accordance with the shapes of the electronic components of the wristwatch.

Figure 7:
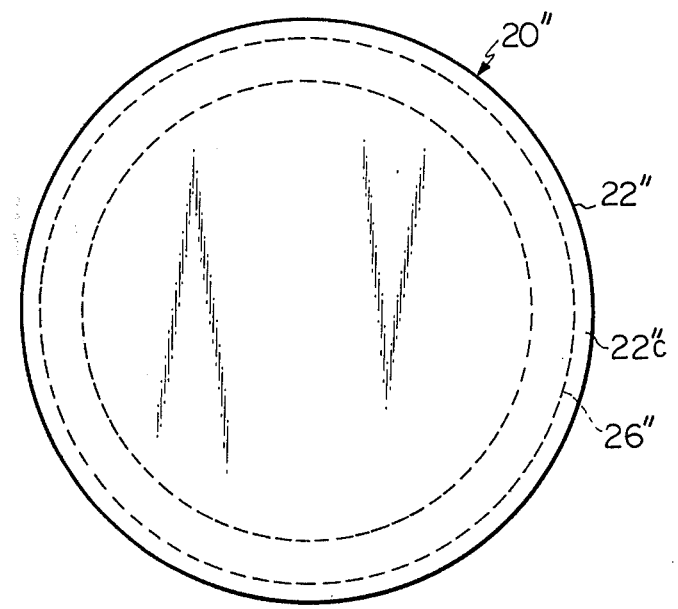
FIG. 7 is a plan view showing another preferred embodiment of the battery according to the present invention.

FIG. 7 shows another modified form of the battery according to the prsent invention. In this modification, the battery 20" comprises a substantially annular battery chamber 26" in which an annular electrode construction is housed. This electrode construction is similar in cross section to that of FIG. 6B. While the outer periphery of the battery chamber 26" is similar to that of the sealing flange 22"c of the battery cup 22", the arrangement may be such that the battery chamber 26" has a dual-periphery circular configuration whereas the sealing flange 22"c has a single-periphery circular configuration. Where the battery of this construction is applied to a wristwatch, since the battery chamber 26" provides a cylindrical inner space, the electronic components and mechanical parts of an electronic wristwatch of the circular dial type can be satisfactorily accommodated within the watch case. It should be understood that the shape of the battery chamber 26" may be modified into various shapes in accordance with design considerations of components of the wristwatch. In the batteries shown in FIGS. 6 and 7, since the battery chamber 26' or 26" has a large area parallel to the watch face, the battery has four or five times the capacity of a conventional battery having equal thickness. Even in this case, the battery can leave more space within the watch case, as already described. Accordingly, it is possible to reduce the thickness of the battery to a value less than half that of a conventional battery. In the design of a wristwatch, the configuration of the electronic components can be designed first. Then the battery can be arranged to have a battery chamber accommodated within the space remaining in the watch case. In this manner, sufficient spacing is provided for the electronic components and, in addition, the battery can be manufactured to have a larger capacity to provide a longer life. If, in this case, it is required to use a battery having a higher capacity in the electronic wristwatch, the battery can be manufactured without increasing the total thickness of the watch case such that it has a battery chamber formed in an annular shape, as shown in FIG. 7.

The present invention may also be applied to a miniaturized alkali storage battery. In this case, the separator support may be made of a suitable organic resilient alkali-resistant material such as nylon or polypropylene.

Figure 8A:
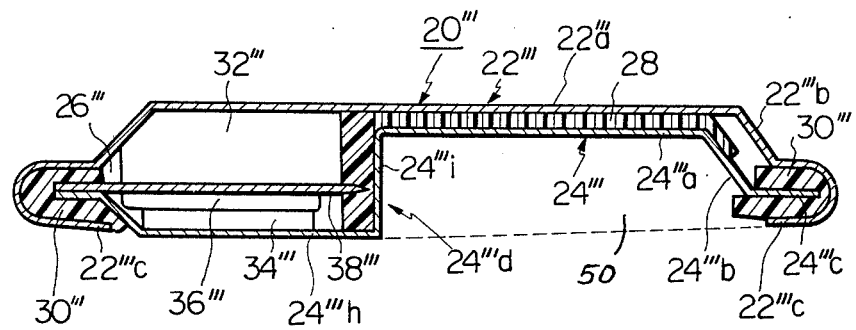
FIG. 8A is a cross-sectional view illustrating a further preferred embodiment of the battery according to the present invention.
Figure 8B:
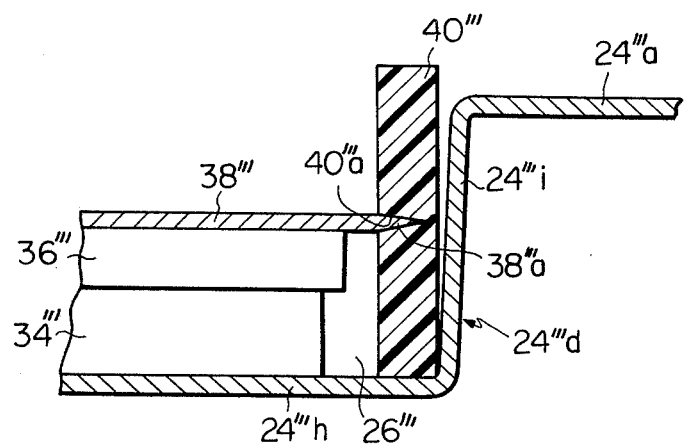
FIG. 8B is a fragmentary cross-sectional view showing the battery of FIG. 8A.

FIGS. 8A and 8B show a further modified form of the battery according to the present invention. In this illustrated modification, the battery cap 24''' does not have the shoulder 24f or the slanted wall 24g shown in FIGS. 3 and 6, but has a wall 24'''i parallel to the cylindrical axis of the battery extending from the flat wall 24'''a toward the flat wall 24'''h at a right angle to the cylindrical axis of the battery to provide more space 50 for accommodating components of the electronic device. In this case, the separator support 40''' is formed with a transversely extending slit 40'''a by which a sharp edge 38'''a of the separator 38''' is fixed in place as shown in FIGS. 8A and 8B. This separator support 40''' is disposed between the battery cup 22''' and the flat wall 24'''h of the battery cap 24'''. The electrode construction of the battery 20''' is similar to that of FIGS. 3A and 3B and, therefore, a detailed description of the same is omitted.

It will now be appreciated from the foregoing description that in accordance with the present invention, a battery has a battery chamber having an outer periphery different from that of the sealing flanges of the battery, whereby the capacity of the battery can be increased while the battery thickness can be significantly reduced.

It will also be understood that a battery of the present invention provides ease of sealing by a crimping operation during battery assembly, because it has a rounded outer periphery at its sealing flange portions. The battery can therefore be manufactured to have a longer life.

While the present invention has been shown and described with reference to particular embodiments, it should be noted that various other modifications or changes can be made without departing from the scope of the present invention.

What is claimed is:

1. In a battery having a positive electrode, a negative electrode and an electrolyte, the improvement comprising: a battery cup including a flange at its outer periphery; a battery cap including a flange at its outer periphery, said battery cap having a generally flat wall idented from the flange of said cap and a ridge portion extending from said flat wall toward said flange of said cap; at least one battery chamber formed between said battery cup and said ridge portion of said battery cap for accommodating said positive electrode, said negative electrode and said electrolyte; an insulating layer disposed between said battery cup and said flat wall of said battery cap; and sealing means disposed between said flanges of said battery cup and said battery cap.

2. The improvement according to claim 1, in which said battery also has a separator disposed between said positive and negative electrodes, and further comprising a separator support disposed between said battery cup and said ridge portion of said battery cap for fixedly supporting said separator in place.

3. The improvement according to claim 1, in which said battery chamber has an outer periphery different in shape from the outer peripheries of each flange of said battery cup and said battery cap.

4. The improvement according to claim 1, in which said flanges of said battery cup and said battery cap are substantially annular in shape, and said battery chamber has a contour other than circular at its outer periphery.

5. The improvement according to claim 1, in which said flat wall of said battery cap has a substantially rectangular shape, and said battery chamber has a substantially arcuate shape.

6. The improvement according to claim 1, in which said battery chamber has a substantially annular shape.

7. The improvement according to claim 2, in which said ridge portion of said battery cap has two sloping walls and a shoulder portion between said sloping walls.

8. The improvement according to claim 7, in which said separator support is disposed between said battery cup and said shoulder portion of said battery cap.

9. The improvement according to claim 2, in which said ridge portion of said battery cap has a flat wall parallel to the cylindrical axis of the battery and another flat wall at right angles to said axis.

10. The improvement according to claim 9, in which said separator support is disposed between said battery cup and said flat wall of said ridge portion which is at right angles to said axis.

11. The improvement according to claim 10, in which said separator support has a transversely extending slit which supports an edge of said separator.

* * * * *